(12) United States Patent
Thiele

(10) Patent No.: US 6,251,152 B1
(45) Date of Patent: Jun. 26, 2001

(54) VACUUM RECEIVER FOR SEPARATING PARTICLES IN A GAS FLOW HAVING AN INLET HOUSING INSERTABLE AND REMOVABLE FROM AN OPENING IN A COVER OF THE VACUUM RECEIVER

(75) Inventor: Charles W. Thiele, Kalamazoo, MI (US)

(73) Assignee: C.W. Thiele Company, Kalamazoo, MI (US)

( * ) Notice: Subject to any disclaimer, the term of this patent is extended or adjusted under 35 U.S.C. 154(b) by 0 days.

(21) Appl. No.: 09/394,260

(22) Filed: Sep. 10, 1999

(51) Int. Cl.$^7$ ........................ B01D 45/08; B01D 35/157; B01D 50/00
(52) U.S. Cl. ............................. 55/318; 55/417; 55/420; 55/465; 55/467; 55/505; 406/168
(58) Field of Search ................ 55/318, 417, 320, 55/420, 432, 462, 465, 467, 505; 15/353; 406/168

(56) References Cited

U.S. PATENT DOCUMENTS

| 1,623,079 | * | 4/1927 | Zimmermann | 55/465 |
| 4,179,769 | * | 12/1979 | Lundquist | 55/417 |
| 4,583,885 | | 4/1986 | Thiele | 406/168 |
| 4,726,825 | * | 2/1988 | Notake | 55/318 |
| 5,340,241 | | 8/1994 | Thiele et al. | 406/132 |
| 5,490,745 | | 2/1996 | Thiele et al. | 406/132 |
| 5,622,457 | | 4/1997 | Thiele | 406/1 |
| 5,776,217 | | 7/1998 | Thiele | 55/417 |

FOREIGN PATENT DOCUMENTS 5-147734  * 6/1993 (JP) ..................... 406/168

* cited by examiner

Primary Examiner—David A. Simmons
Assistant Examiner—Robert A. Hopkins
(74) Attorney, Agent, or Firm—Flynn, Thiel, Boutell & Tanis, P.C.

(57) ABSTRACT

A vacuum receiver for separating particles entrained in a gas-particle stream and for allowing a gas stream to exit from the vacuum receiver to an exhaust blower while simultaneously allowing the particles to remain in a particle receiving vessel having an open top. A cover is provided which has a top wall with a perimeter thereof resting on a surface of the receiving vessel encircling the open top. The cover has two openings therethrough, the first opening being oriented directly above the particle receiving vessel and a second opening being oriented on an axis that is wholly outside a peripheral boundary of the particle receiving vessel. The cover further includes a structure defining a passageway extending from the particle receiving vessel to the aforesaid second opening. A reciprocal valve member is mounted in the passageway and a drive motor is provided therefor which is mounted on an exterior part of the passageway to facilitate easy access thereto.

15 Claims, 2 Drawing Sheets

VACUUM RECEIVER FOR SEPARATING PARTICLES IN A GAS FLOW HAVING AN INLET HOUSING INSERTABLE AND REMOVABLE FROM AN OPENING IN A COVER OF THE VACUUM RECEIVER

FIELD OF THE INVENTION

This invention relates to a vacuum receiver that separates a granular product from an incoming air stream without the use of internal filters. More particularly, this invention relates to a vacuum receiver in a pneumatic conveying system of the type wherein a granular product is conveyed by an air stream from a material supply to a machine or like destination in a processing line where the product is to be used.

BACKGROUND OF THE INVENTION

The invention disclosed herein arose out of a need to further simplify the constructions in my earlier vacuum receiver products represented by the teachings in U.S. Pat. Nos. 4,583,885 and 5,776,217. In order to dismantle the aforesaid vacuum receivers, several complicated steps need to be taken in order to effect the removal of the components that deliver the gas entrained particulate to the interior of the vacuum receiver. During use of these vacuum receivers, time is usually of the essence and, therefore, any reduced amount of down time for servicing purposes will be appreciated by the end user.

Accordingly, it is an object of this invention to provide a vacuum receiver that separates a granular product from an incoming air stream and delivers the particulate to a vacuum receiver vessel, wherein the structure for delivering the gas entrained particulate to the vacuum receiver is configured to be in a slip-fit relation to the vacuum receiver to enable it to be simply removed from the vacuum receiver without removal of the lid covering the top of the vacuum receiver.

It is a further object of the invention to provide a vacuum receiver, as aforesaid, wherein the gas entrained particulate delivery structure includes a housing with an interior chamber that is larger in cross section than an area of a perpendicular cross section of a gas entrained particulate delivering pipe so that the deceleration of the particles prior to their entry into the vacuum receiver occurs before the particles enter the vacuum receiver.

A further object of the invention is to provide a vacuum receiver, as aforesaid, wherein the entry port into the vacuum receiver includes an elongate pipe which has a plurality of circumferentially and lengthwise spaced perforations along a length thereof to facilitate the flow of gas therethrough and to reduce the amount of gas flowing out through the outlet end of the pipe.

A further object of the invention is to provide a vacuum receiver, as aforesaid, wherein the structure that effects a deceleration of the particles is contained on a removable plate forming a wall of the interior chamber to thereby enable removal of the plate and a replacement thereof with a new one.

A further object of the invention is to provide a vacuum receiver, as aforesaid, wherein a downwardly inclined ramp surface is provided between a region adjacent a lower edge of the removable plate and an entrance from the interior chamber into the vacuum receiver so as to facilitate the movement of slowed particles from the plate to and into the entry port to the vacuum receiver.

A further object of the invention is to provide a vacuum receiver, as aforesaid, wherein the inlet pipe delivering gas entrained particulate to the interior chamber is slidingly secured in the inlet opening of the housing and is removable from the housing through an opening created when the removable plate is removed.

A further object of the invention is to provide a vacuum receiver, wherein the inlet opening to the vacuum receiver is oriented directly above the particle receiving vessel and a second opening into the particle receiving vessel and to which a suction blower is connected is oriented on an axis that is wholly outside the peripheral boundary of the particle receiving vessel, with the lid for the vacuum receiver further including structure defining a passageway extending from the particle receiving vessel to the aforesaid second opening. A reciprocal valve mechanism is mounted in the passageway with a drive motor therefor being mounted on the exterior part of the passageway to facilitate easy access thereto.

SUMMARY OF THE INVENTION

The objects and purposes of the invention are met by providing a vacuum receiver for separating particles entrained in a gas-particle stream and for allowing a gas stream to exit from the vacuum receiver to an exhaust blower while simultaneously allowing the particles to remain in a particle receiving vessel having an open top. A cover is provided which has a top wall with a perimeter thereof resting on a surface of the receiving vessel encircling the open top. The cover further includes first and second separate openings through the top wall with the second opening being configured to be connected to the aforesaid exhaust blower. An inlet housing is provided which includes a wall defining an interior chamber. The interior chamber has an inlet opening provided through the wall. A pipe is sealingly received in the inlet opening and is configured to deliver gas entrained particles to the interior chamber. An end of the pipe located inside the interior chamber has a check valve mechanism mounted thereon to limit to a single direction the flow of gas entrained particles through the pipe. A first outlet opening is provided in the housing which is axially aligned with the first opening through the top wall of the lid. An elongate pipe is provided with one end thereof being fixedly connected to the outlet opening from the housing and extending through the first opening in the lid. An opposite end of the outlet pipe terminates in the aforesaid particle receiving vessel. The inlet housing and the elongate outlet pipe are configured to be removable as a unit from and insertable as a unit into the first opening through the top wall enabled by a slip-fit relation between the inlet housing and the elongate pipe connected thereto and the first opening in the top wall so that an exhaust blower, in operation, will create a less than atmospheric pressure in the particle receiving vessel to draw either the inlet housing or the elongate outlet pipe connected thereto into a snug and sealed relation to the top wall.

The objects and purposes of this invention are further met by providing a cover on the upper end of the particle receiving vessel which has two openings therethrough, the first opening being oriented directly above the particle receiving vessel and a second opening being oriented on an axis that is wholly outside a peripheral boundary of the particle receiving vessel. The cover further includes a structure defining a passageway extending from the particle receiving vessel to the aforesaid second opening. A reciprocal valve member is mounted in the passageway and a drive motor is provided therefore which is mounted on an exterior part of the passageway to facilitate easy access thereto.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
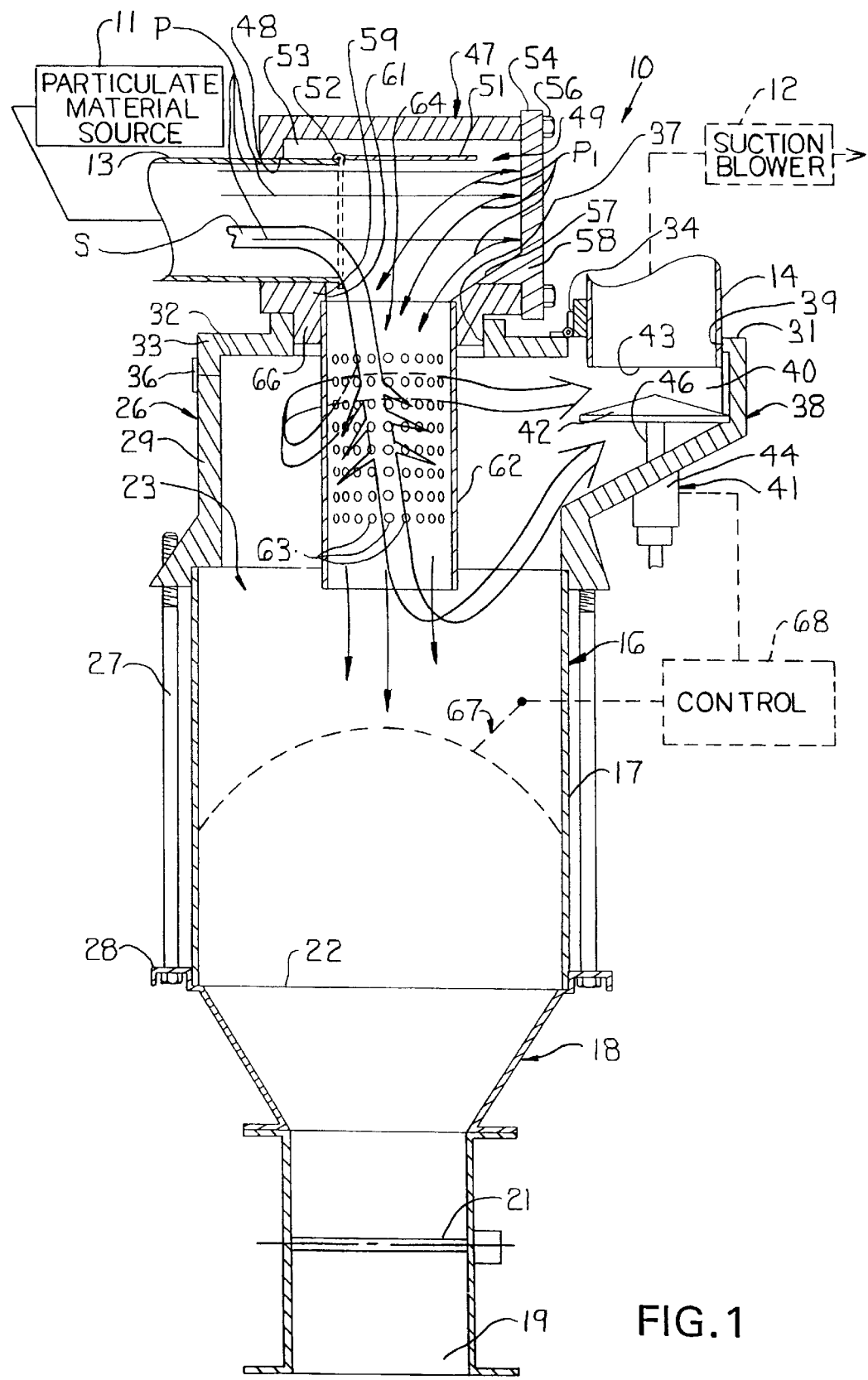
FIG. 1 is a central sectional view through a vacuum receiver embodying the invention.

Certain terminology may be used in the following description for convenience and reference only and will not be limited. The words "up" and "down" will designate direction in the drawings to which reference is made. The words "upstream" and "downstream" will refer to the direction of material flow through the device, "upstream" to "downstream" being the normal flow direction. The words "in" and "out" will refer to directions toward and away from, respectively, the geometric center of the device and designated parts thereof. Such terminology will include the words above specifically mentioned, derivatives thereof and words of similar import.

While the following discussion does not refer to the use of the device in conjunction with any specific type of equipment, it is to be understood that its application is broad based and can be applied to the filling of a variety of extruders, injection molding machines, storage silos, mixers, and virtually any other receiving vessel or device to which the particulate material would have to be conveyed.

The subject matter of my earlier issued U.S. Pat. Nos. 4,583,885 and 5,776,217 are incorporated herein by reference. Environments into which this invention can be utilized are disclosed in my earlier issued U.S. Pat. No. 5,622,457 and the subject matter of this patent is to be incorporated by reference as well. In addition, a device for effecting the entrainment of particles into a gas stream is disclosed in my earlier issued U.S. Patent No. 5 340 241 and the subject matter of this patent is to be incorporated herein by reference as well.

FIG. 1 illustrates a vacuum receiver 10 adapted to separate a particulate material or particles P entrained in a gas-particle stream S from a particulate material source 11. The particles at the source 11 are entrained into a gas-particle stream by, for example, a pneumatic vacuum conveying system as shown in U.S. Pat. Nos. 4,583,885, 5,340, 241 and 5,490,745. The subject matter of U.S. Pat. No. 5,490,745 is additionally to be incorporated by reference. The blower means 12 creates a gas flow within a gas tight gas flow system represented in FIG. 1 by the inlet unit or pipe 13, outlet unit or pipe 14 and the vacuum receiver 10 generally oriented between the inlet pipe 13 and the outlet pipe 14.

The vacuum receiver 10 includes a hollow interior hopper or vessel 16. The vessel includes a cylindrical shell 17 mounted on a base 18 defining a funnel-like structure leading to an outlet opening 19. A conventional flap valve 21 is provided in the outlet opening 19 and is rotatable between open and closed positions in relationship to the outlet opening 19, the closed position being illustrated in FIG. 1 and the open position being illustrated in FIG. 2. In this particular embodiment, the cylindrical shell 17 rests on a shelf 22 provided adjacent the upper edge of the base 18. The upper end of the shell 17 is open as indicated at 23.

A gas tightly closed cover 26 is mounted on the upper end of the shell 17. A plurality of internally threaded openings are provided around the periphery of the lower edge of the cover 26 and are adapted to receive the threaded end of elongate bolts 27 which are used to draw the cover 26 tightly down on to the upper end of the shell 17. More specifically, the upper edge of the base 18 includes an annular radially outwardly extending flange 28 having a plurality of holes therein which are to be axially aligned with the internally threaded holes in the cover 26 so that the bolts 27 can extend through the holes in the flange 28 and be threadedly engaged with the internally threaded holes in the cover 26 to draw, as aforesaid, the cover tightly down onto the top of the vessel 17.

The cover 26 includes an upstanding side wall 29 extending upwardly from the top of the shell 17 to a top wall 31 which effectively closes off the upper portion of the cover 26. An opening 32 is provided in the top wall 31 which is sealingly closed off by a lid 33 hingedly secured thereto as at 34. A latch, schematically illustrated as at 36, is provided to lock the lid 33 in the closed, sealed, position as illustrated in FIG. 1.

An opening 37 is provided in the lid 33, the axis of the opening 37 being generally coaxial with the central axis of the shell 17. While the coaxial relationship between the opening 37 and the central axis of the shell 17 is not critical, the opening 37 is preferably oriented directly above the opening 23.

Figure 2:
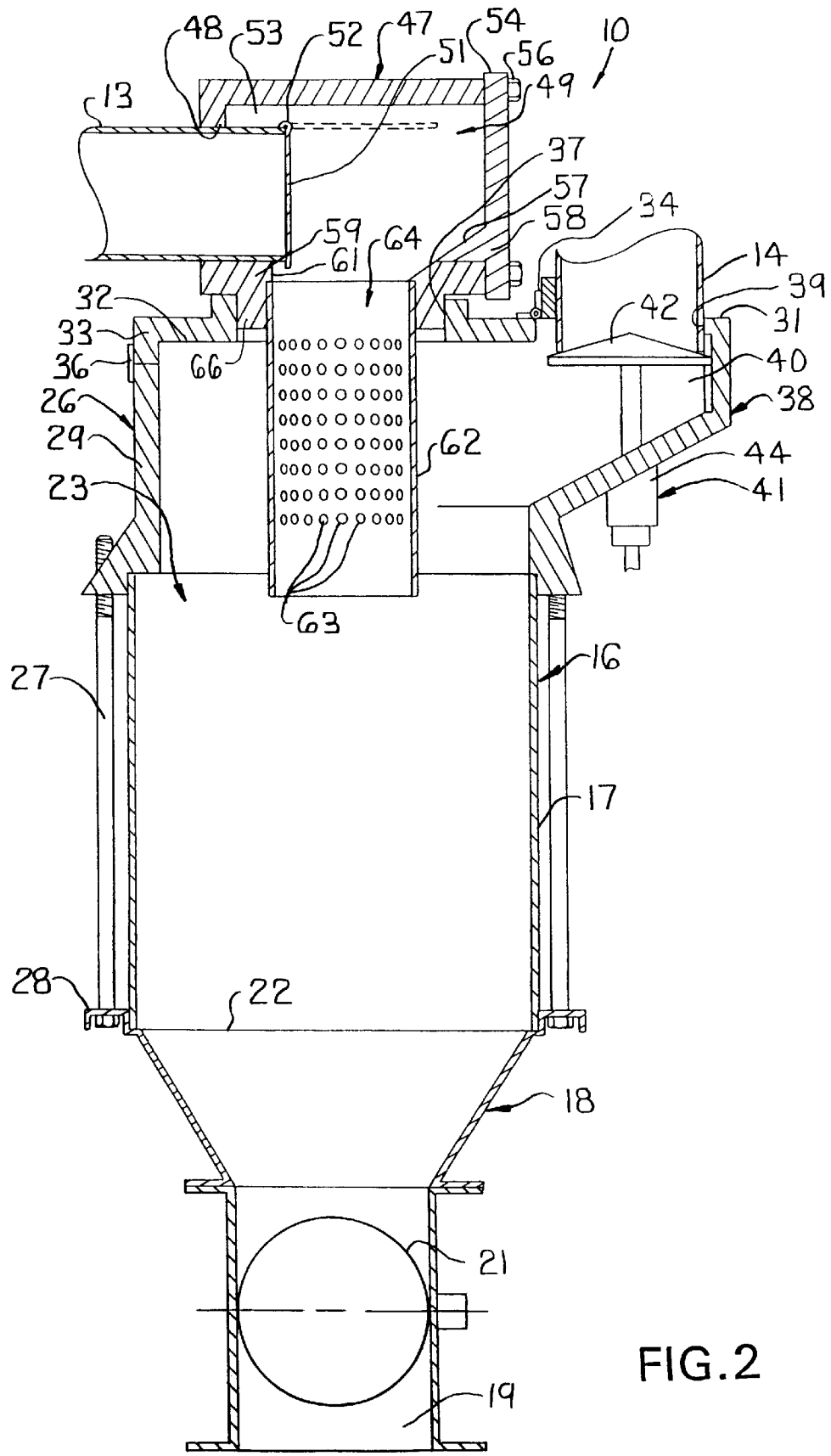
FIG. 2 is a view like FIG. 1 but in an altered state of operation.

As is illustrated in FIGS. 1 and 2, the cover 26 and side wall 29 include a radially outwardly extending section 38 that is oriented wholly outside the theoretical cylinder defined by the shell 17. This section 38 is open on the inside thereof to the interior of the cover 26. An opening 39 is provided in the top wall 31 covering the top of the section 38. The outlet pipe 14 is connected to the top wall 31 with its end thereof gas-tightly received in the opening 39.

A reciprocal valve mechanism 41 is mounted on the radially outwardly projecting section 38 and includes a valve member 42 which is supported for movement toward and into a sealed engagement with a lower end 43 of the pipe 14 (as shown in FIG. 2) as well as away therefrom to the position illustrated in FIG. 1. This reciprocal movement of the valve member is controlled by an actuator 44 of the valve mechanism 41 oriented on the external portion of the section 38. The valve member 42 is connected to the actuator 44 by a reciprocal rod 46 thereof extending through a not illustrated opening in a wall section of the section 38.

An inlet housing 47 is provided which includes a through opening 48 in one wall thereof and a further opening 49 directly aligned therewith but at an opposite side of the housing 47. The inlet pipe 13 is received in the opening 48 and a sealed relation exists between the periphery of the pipe 13 and the radially inwardly facing surface of the opening 48. A flat plate 51 is hingedly secured as at 51 to the end of the inlet pipe 13 oriented in an interior chamber 53 of the inlet housing 47. The flat plate 51 is movable between two positions, namely, the open position illustrated in solid lines in FIG. 1 and the closed position illustrated in solid lines in FIG. 2. When the flat plate 51 is in the closed position illustrated in FIG. 2, it serves as a check valve preventing the back flow of gas into the inlet pipe 13.

The opening 49 is closed by a cover plate 54 secured to the inlet housing 47 by a plurality of screws 56. In this particular embodiment, the cover plate 54 includes an inclined flat surface 57 adjacent a bottom edge of the cover plate 54. The angle of inclination is in the range of 40° to 60° to the horizontal, preferably about 50°. The inclined surface 57 can be provided on a key-like extension piece 58 of the cover plate so that the key will assure a proper placement of the cover plate 54 onto the inlet housing 47.

The bottom wall 59 of the inlet housing 47 has an opening 61 therein into which is secured, as by a threaded connection, an elongate pipe 62 having a plurality of through holes 63 therein. As is illustrated in the drawings, the holes are circumferentially and lengthwise spaced along the length of the pipe 62. Furthermore, the size of the through holes 63 is selected so that particulate entering the inlet end 64 of the pipe 62 will not pass through the holes 63. Instead, only gas and dust particles, if any, will pass through the openings 63.

The bottom wall 59 of the inlet housing 47 includes a cylindrical sleeve-like section 66 that is adapted to be snuggly sleeved into the opening 37 in the lid 33. The fit between the radially outward surface of the sleeve-like section 66 and the radially inwardly facing surface of the opening 37 is of a slip-fit type so that the exhaust blower means 12, in operation, will be able to create a less than atmospheric pressure in the particle receiving vessel 10 to draw the sleeve-like section 66 into the opening 37 and be sealed thereat. If desired, an O-ring or other type of gasket material can be provided between the outwardly facing surface of the sleeve-like section 66 and the radially inwardly facing surface of the opening 37 to enhance the aforesaid sealed relationship. In the alternative, the opening 37 can be of a diameter to receive just the outlet pipe 62 therethrough with the sealed relationship existing between the peripheral surface of the outlet pipe 62 and the radially inwardly facing surface of the opening 37.

A level sensor 67 is provided inside the shell 17 portion of the vacuum receiver 10 and is configured to sense and indicate the level of the particulate gathering in the vacuum receiver 10 when the flap valve 21 is in the closed position as illustrated in FIG. 1. When the level sensor 67 detects an appropriate particle level inside the vacuum receiver 10, a signal will be sent to a control circuit 68 which, in turn, sends a signal to the actuator 44 to cause the actuator 44 to drive the valve member 42 into a closed and sealed relation with the end 43 of the outlet pipe 44, namely, to the position illustrated in FIG. 2 and thereafter send a signal to the flap valve 21 to cause it to rotate from the closed position illustrated in FIG. 1 to the open position illustrated in FIG. 2 to facilitate the dumping of the contents collected in the vacuum receiver into an end user machine.

OPERATION

Although the operation of the vacuum receiver described above will be understood from the foregoing description by skilled persons, a summary of such description is now given for convenience.

When the suction blower means 12 is activated, an airflow is caused to occur, provided the actuator 44 of the valve mechanism 41 has moved the valve member 42 to the open position illustrated in FIG. 1, a flow of gas will cause a gas-particle stream S to flow from the particulate material source 11 through the inlet pipe 13 into the interior chamber 53 of the inlet housing 47 and causing the particulate to strike the inside facing surface of the cover plate 54 to decelerate the particulate P. The particulate $P_1$ so decelerated will move into the inlet end 64 of the pipe 62 and thence fall out of the outlet end of the pipe 62 into the shell 17 of the vessel 16. All during the aforesaid operation, the control circuitry 68 will have oriented the flap valve 21 into the closed position as illustrated in FIG. 1, the flap valve 21 preventing the back flow of gas into the outlet end 19 of the base 18 and thence into the interior of the vessel 16. The gas entering the inlet end 64 of the pipe 62 will be permitted to travel through the perforations 63 so as to minimize the volume of gas traveling out the outlet end of the pipe 62 and thence to the outlet pipe 14. The "bleeding" of gas through the perforations 63 further facilitates the disentrainment of the particles $P_1$ from the gas stream so that the particles will not be drawn into the outlet pipe 14.

An advantage of the aforesaid construction is that if the gas-particle stream S is ladened with dust particles, the dust particles will be sucked through the perforations 63 to enable them to exit through the outlet pipe 14 and thereby effect a de-dusting of the particulate entering the vessel 16.

When the particulate level has reached the point where the level sensor 67 is tripped, the control circuitry 68 will effect an actuation of the actuator 44 of the valve mechanism 41 to effect a closing of the valve member 42 to the position illustrated in FIG. 2. Thereafter, the control circuitry 68 will effect a movement of the flap valve 21 to the open position also illustrated in FIG. 2 to effect a dumping of the particulate content in the vessel 16 into an end user machine.

For servicing the vacuum receiver as disclosed herein and with the suction blower means 12 rendered inactive, the machine operator need only to pull up on the inlet housing 47 to effect a removal thereof from an association with the lid 33. If desired, although not necessarily, quick release connectors, not illustrated, can be provided to initially hold the inlet housing 47 to the lid 33. Thereafter, the latch 36 can be released to enable the lid 33 to be pivoted about the axis of the hinge 34 to an open position to allow access into the interior of the vacuum receiver 10 to facilitate cleaning and other maintenance. Thereafter, the operator need only to close the lid 33, relock the latch 36 and place the inlet housing 47, particularly the outlet pipe 62 thereon back into the opening 37 and affect the sealed relationship between the inlet housing 47 and the lid 33 as aforesaid.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a vacuum receiver for separating particles entrained in a gas-particle stream and for allowing a gas stream to exit from the vacuum receiver to an exhaust blower means while simultaneously allowing the particles to remain in a particle receiving vessel having an open top, the improvement comprising:

a cover having a top wall with a perimeter thereof resting on a surface of said receiving vessel encircling said open top, said cover further including first and second separate openings therethrough, said second opening being configured to be connected to said exhaust blower means;

an inlet housing including a wall defining an interior chamber, an inlet opening provided through said wall of said inlet housing, a pipe sealingly received in said inlet opening and configured to deliver gas entrained particles to said interior chamber, an end of said pipe located inside said interior chamber having a check valve mechanism mounted thereon to limit to a single direction the flow of gas entrained particles through said pipe, said single direction being directed only into said interior chamber, a first outlet opening in said inlet housing axially aligned with said first opening through said cover, an elongate outlet pipe, one end of said elongate outlet pipe being fixedly connected to said first outlet opening, and extending through said first opening with an opposite end thereof terminating inside said particle receiving vessel, said inlet housing and said elongate outlet pipe being configured to be removable as a unit from and insertable as a unit into said first opening enabled by a slip fit relation between said inlet housing and said elongate pipe connected thereto and said first opening, whereby said exhaust blower means, in operation, will create a less than atmospheric pressure in said particle receiving vessel to draw at least one of said inlet housing and said elongate outlet pipe connected thereto into a snug and sealed relation to said top wall.

2. The vacuum receiver according to claim 1, wherein said elongate outlet pipe has a plurality of circumferentially and lengthwise spaced perforations along a length thereof to facilitate the flow of gas therethrough and to reduce the amount of gas flowing out through said opposite end.

3. The vacuum receiver according to claim 1, wherein said interior chamber is larger in cross section than an area of a perpendicular cross section of said pipe so that a velocity of gas flow through said interior chamber is lessened to enhance said particles becoming disentrained from said gas flow.

4. The vacuum receiver according to claim 3, wherein said interior chamber of said inlet housing includes a wall surface oriented perpendicular to a longitudinal axis of said pipe and configured to facilitate gas entrained particles exiting said pipe striking said wall surface, be decelerated and be disentrained from said gas flow.

5. The vacuum receiver according to claim 4, wherein said wall surface is a part of a removable plate secured to said inlet housing so as to facilitate removal thereof and replacement with a new plate.

6. The vacuum receiver according to claim 5, wherein downwardly inclined ramp surface is provided between a region adjacent a lower edge of said removable plate and an entrance from said interior chamber into said one end of said elongate outlet pipe to facilitate the movement of slowed particles from said plate to and into said one end of said elongate outlet pipe.

7. The vacuum receiver according to claim 5, wherein said pipe in said inlet opening is slidingly received in said inlet opening as well as slidingly removed from said inlet opening with said check valve remaining therewith through an opening in said wall surface of said inlet housing created when said removable plate is removed.

8. The vacuum receiver according to claim 1, wherein said first opening is oriented through said top wall of said cover and is generally coaxially related to said particle receiving vessel, and wherein said second opening is oriented on said cover at a location that is wholly outside of a peripheral boundary of said particle receiving vessel;

wherein said cover includes means defining a passageway extending from said particle receiving vessel to said second opening;

wherein a reciprocal valve member is mounted in said passageway for movement toward and to a closed first relation with said second opening and away from and to an opened second relation with said second opening to control the flow of gas therepast; and wherein a drive motor coupled to said valve member is mounted on an exterior part of said passageway to facilitate easy access thereto.

9. The vacuum receiver according to claim 8, wherein said means defining a passageway includes a wall configuration integral with said cover.

10. The vacuum receiver according to claim 9, wherein said wall configuration additionally includes a skirt downwardly extending from a peripheral edge of said top wall to rest on said surface of said receiving vessel encircling said open top.

11. The vacuum receiver according to claim 10, wherein said cover includes a third opening and a hingedly supported lid therefor movable between opened and closed relation relative to said third opening, and a lock for latching said lid in said closed relation to said third opening, said first opening being oriented in said lid.

12. In a vacuum receiver for separating particles entrained in a gas-particle stream and for allowing a gas stream to exit from the vacuum receiver to an exhaust blower means while simultaneously allowing the particles to remain in a particle receiving vessel having an open top, the improvement comprising:

a cover having a top wall with a perimeter thereof resting on a surface of said receiving vessel encircling said open top, said cover further including first and second separate openings therethrough, said second opening being configured to be connected to said exhaust blower means, said first opening being oriented directly above said particle receiving vessel, said second opening being oriented on said cover at a location that is wholly outside of a peripheral boundary of said particle receiving vessel, said cover further including means defining a passageway extending from said particle receiving vessel to said second opening;

a reciprocal valve member mounted in said passageway for movement toward and to a closed first relation with said second opening and away from and to an opened second relation with said second opening to control the flow of gas therepast; and a drive motor coupled to said valve member mounted on an exterior part of said passageway to facilitate easy access thereto.

13. The vacuum receiver according to claim 12, wherein said means defining a passageway includes a wall configuration integral with said cover.

14. The vacuum receiver according to claim 13, wherein said wall configuration additionally includes a skirt downwardly extending from a peripheral edge of said top wall to rest on said surface of said receiving vessel encircling said open top.

15. The vacuum receiver according to claim 14, wherein said cover includes a third opening and a hingedly supported lid therefor movable between opened and closed relation relative to said third opening, and a lock for latching said lid in said closed relation to said third opening, said first opening being oriented in said lid.

* * * * *